UNITED STATES PATENT OFFICE.

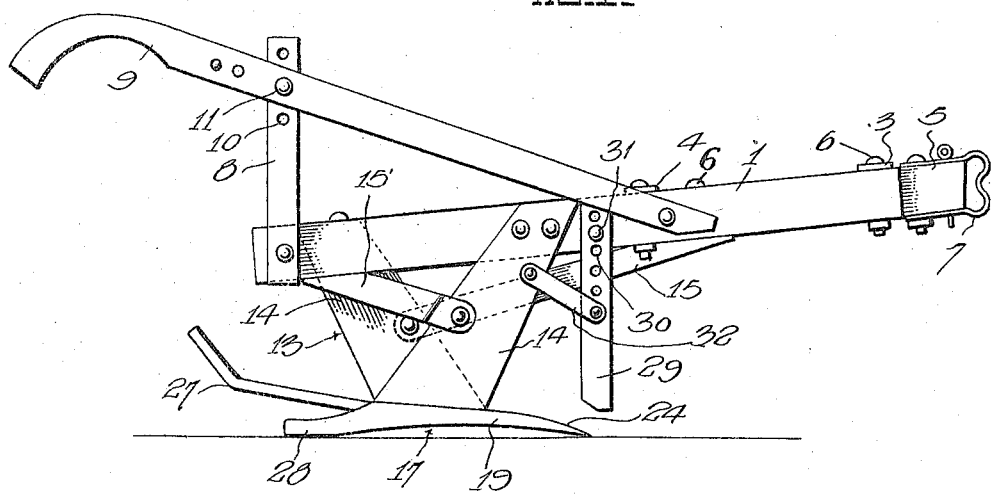
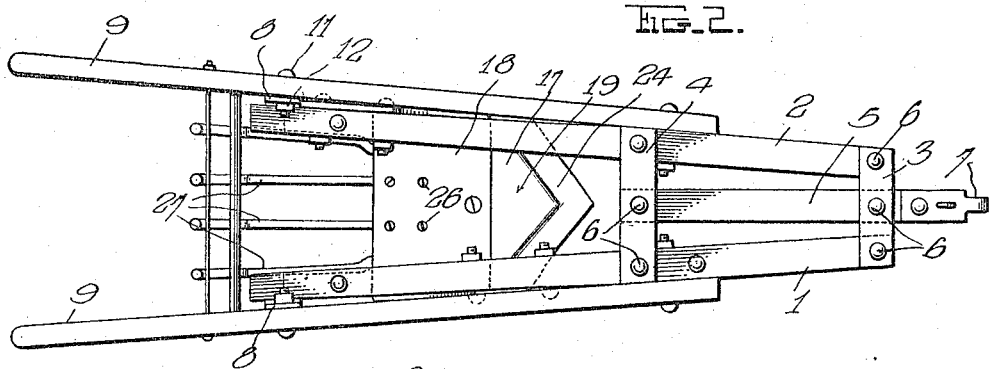
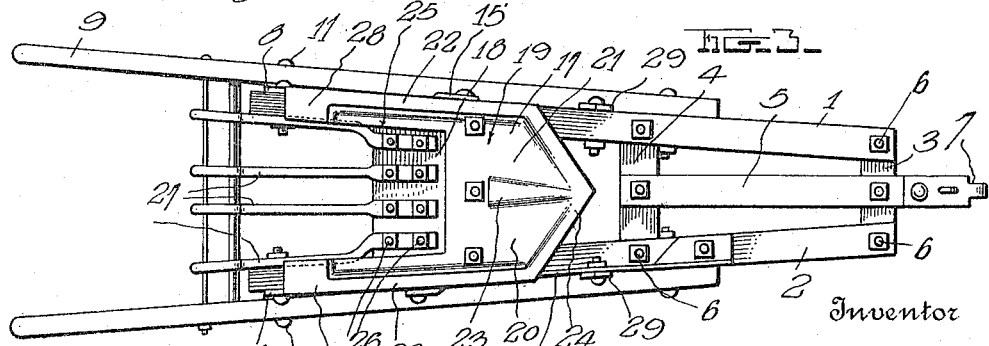

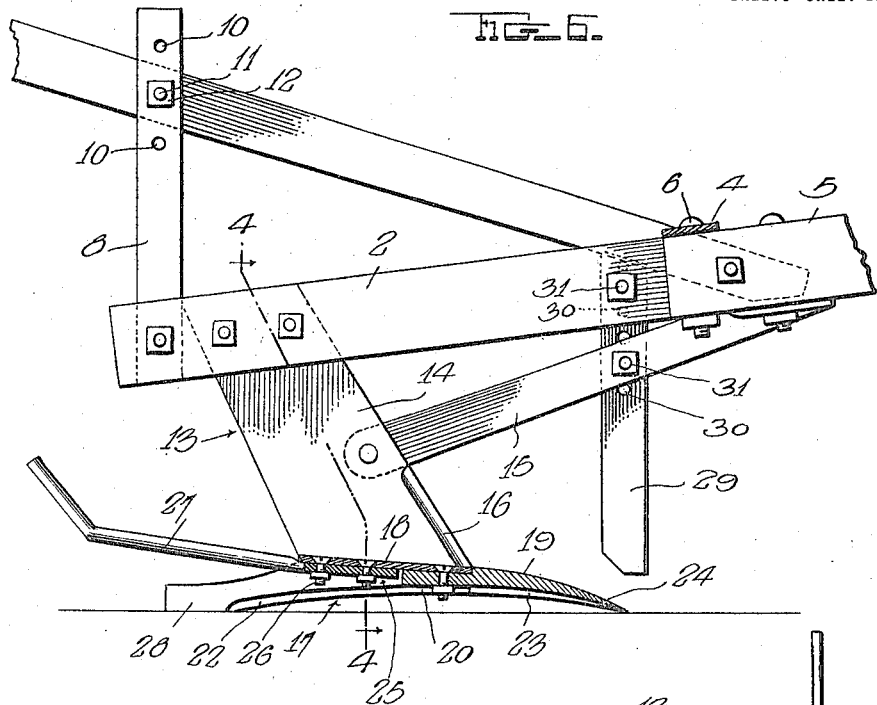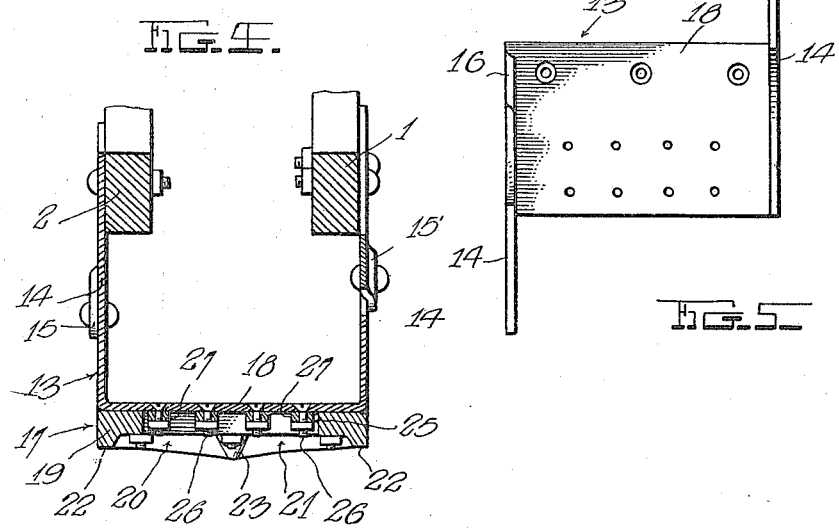

JAMES H. BRODIE, OF HENDERSON, NORTH CAROLINA.

PEANUT-DIGGER.

1,193,112.  Specification of Letters Patent.  Patented Aug. 1, 1916.

Application filed November 15, 1915. Serial No. 61,613.

*To all whom it may concern:*

Be it known that I, JAMES H. BRODIE, a citizen of the United States, residing at Henderson, in the county of Vance and State of North Carolina, have invented certain new and useful Improvements in Peanut-Diggers; and I do declare the following to be a full, clear, and exact description of the invention, such as will enable others skilled in the art to which it appertains to make and use the same.

This invention relates to improvements in diggers or plows for harvesting potatoes, peanuts, beets, turnips and the like, and has for its principal object to provide a simply constructed device which will effectively dig the fruit without injuring the same.

An additional object of my invention is to provide a device which can be very inexpensively manufactured and yet which will be highly efficient in operation.

With the above and minor objects in view, my invention resides in the novel features of construction, combination and arrangement of parts which will hereinafter be more particularly described, and claimed, and shown in the drawings wherein, Figure 1 is a side elevation of my improved peanut digger; Fig. 2 is a top plan view thereof; Fig. 3 is a bottom plan view; Fig. 4 is a substantially vertical section on the line 4—4 of Fig. 6; Fig. 5 is a detail plan view of the plow share carrying member detached from the plow beams; and Fig. 6 is an enlarged detail longitudinal section.

Referring more particularly to the drawings it will be seen that my improved plow or digger is carried by a suitable supporting frame which may be constructed in any ordinary or preferred manner. The frame as it is shown is formed of a pair of slightly inclined rearwardly diverging beams 1 and 2 connected at their forward ends with a strap 3, and adjacent their intermediate portions with an additional strap 4. A draw beam 5 is disposed between the forward ends of the beams 1 and 2 and is secured in operative position relative thereto by the straps 3 and 4, fastening elements 6 being used to secure these straps to the beams. The forward end of the draw beam 5 is provided with a clevice 7 of any preferred construction by which the plow may be attached to the pulling means.

The rear ends of the diverging beams 1 and 2 are provided with upright brace bars 8, said bars being connected by their lower ends to the beams and adjustably connected by their upper ends to a pair of handles 9 which extend upwardly and rearwardly from an intermediate point on the sides of the beams 1 and 2, said handles being adapted to steer the digger as is usual with devices of this character. The brace bars 8 are provided with a plurality of apertures 10 which are adapted to receive bolts 11 extending through apertures in the handles 9, and nuts 12 are threaded on the ends of these bolts to adjustably hold said handles in the correct elevated position.

A U-shaped scoop-like member 13 is attached by its substantially upright arms 14 to the rear end portions of the beams 1 and 2 by any suitable or preferred means. The brace bar 15 extends from the forward edge of one of its arms 14 to the under side of the beam 2, while the shoulder brace 15' extends from the rear edge of the other arm 14 to the under side of the beam 1 adjacent its rear end, thus securely holding said U-shaped member against shifting. The lower half of the front edges of the arms 14 is beveled inwardly as shown at 16. As shown in the various figures of the drawings, the right hand arm 14 is inclined slightly forward while the other arm is inclined toward the rear. This peculiar construction is to prevent congestion of the dirt and vegetation between the arms 14 when the plow is in operation. This arrangement is especially effective in digging fruit which grows in hills, only one of the arms 14 going through a hill at one time, thus greatly decreasing the resistance.

The U-shaped member 13 is designed primarily for carrying a plow share 17 which is secured to the under side of its horizontal portion 18. This plow share is formed of a slightly down-curved plate 19 having a pair of communicating recesses 20 and 21 in its lower face, the material surrounding these recesses forming ribs to prevent lateral shifting of the plow when the same is in operation. Ribs 22 are formed on the longitudinal edges of the plate by these recesses, and the rib 23 is also formed in the middle of the bottom of said plate. These ribs tend to embed themselves in the ground which is being dug up and thus aid in holding the plow in a straight course. The forward end of said plate 19 extends beyond the horizontal portion 18 of the U-shaped member and its front corners are beveled off as shown at 24, thereby providing an obtuse angular plow point. The upper surface of this point is inclined upwardly and rearwardly from its front end to the forward edge of the portion 18, said horizontal portion 18 being set into said plate so that its upper surface is flush with the upper surface of the plow point.

The plate forming the plow share has an opening 25 formed in its rear end as shown in the bottom plan view of the plow. This opening is adapted to receive the bolts 26 and the ends of the rearwardly extending screen fingers 27 which are secured thereby to the horizontal portion of the U-shaped member, thus preventing the vegetation from catching thereon during the operation of the digger. These fingers 27 may be of any length, depending upon the type of fruit which it is desired to harvest. The portions of the plate 19 surrounding the opening 25 form runners 28 which extend a considerable distance beyond the rear edge of the horizontal portion 18 of the U-shaped member.

A vertically adjustable guard 29 is secured to each of the beams 1 and 2 forward of the plow share and they are adapted to direct the vegetation between the upright arms of the U-shaped member and in the line of travel of the plow share 17. These guards are made adjustable by a plurality of apertures 30 formed therein and which receive clamping bolts 31. The guard on the left side of the plow is supported by both the beam 2 and the brace 15, and the one on the opposite side by the beam 1 and an adjustable brace 32 attached by one end to the portion 14 of the U-shaped member 13.

This plow is designed primarily for harvesting fruits which grow in hills in the field. As the plow is drawn across the field the guards will force the plants in the path of the share, which will cut the roots thereof below the ground, the portion of the earth containing the fruit being thrown up into the U-shaped scoop and then being forced onto the screen fingers which will separate the dirt from the fruit and allow the same to be readily collected. By doing away with the usual center standard and providing a U-shaped member for carrying the plow share, the clogging of the plants on the plow share is prevented, the same passing between the upright arms of the U-shaped member and between the divergent beams 1 and 2. While this digger is designed primarily for harvesting peanuts, potatoes, and the like, it can be also used to great advantage for pulling up corn stubble and the roots of tobacco, and grass that it is desired to destroy.

I desire to call particular attention to the fact that my improved plow when harvesting peanuts cuts the roots just below the nuts, thus leaving a very large percentage of these roots in the soil. It is well known that these roots make a very good fertilizer and for this reason it is particularly desirable that they be left in the ground. My plow is so constructed that instead of digging up these roots, it cuts the nuts therefrom and leaves the valuable fertilizing portion in the ground.

In the foregoing I have described certain specific details of construction for producing probably the best results, and in the drawing have shown such details, but it will be evident that I need not be limited thereto otherwise than to the extent to which the appended claims limit me.

I claim:—

1. In a device of the class described, a frame, a U-shaped member carried thereby, a share secured thereto and formed of a slightly down-curved plate having longitudinal ribs on its bottom to prevent lateral shifting, the forward portion of the plate being inclined upwardly and rearwardly to the edge of the horizontal portion of said member, said plate also having an opening formed in the rear portion thereof, the portion of the plate on each side of said opening providing runners.

2. In a device of the class described, a frame, a U-shaped member carried thereby, the upright portions of said member having their edges beveled rearwardly and inwardly, a share secured to the horizontal portion of said member and projecting forwardly, and upright guards depending from the beam forwardly of the share and adapted to force the vegetation in the path of said U-shaped member.

3. In a device of the class described, a frame, a U-shaped member carried thereby, the upright portions of said member having their edges beveled rearwardly and inwardly, a share secured to the horizontal portion of said member and projecting forwardly, and adjustable upright guards depending from the beam forwardly of the share and adapted to force the vegetation in the path of said U-shaped member.

4. In a device of the class described, a pair of rearwardly diverging beams, handles rising therefrom, a U-shaped member secured to the rear end portions of the beams, a draft beam disposed between the forward ends of the first mentioned beams and secured thereto, and a share secured to the horizontal portion of said member, the forwardly projecting portion thereof diverging upwardly and rearwardly to the edge of said horizontal portion.

5. In a device of the class described, a frame, a U-shaped support carried thereby, a share having longitudinal ribs on its bottom to prevent lateral shifting, said share being secured to the under side of the horizontal portion of said U-shaped member and projecting forwardly to provide a plow point, the rear part of said share beneath said horizontal portion having an opening formed therein, and rearwardly extending screen fingers secured to the under side of said horizontal portion, their ends being disposed in said opening to prevent their catching any vegetation which is being dug.

6. In a device of the class described, a frame, a U-shaped member carried thereby, and a share secured to the horizontal portion of the member, one upright arm of the member being inclined forwardly and the other rearwardly, whereby the congestion of dirt and vegetation between said arms will be prevented.

7. In a device of the class described, a pair of beams, a U-shaped member, one upright arm thereof being secured to each beam, a share secured to the horizontal portion of the member, a brace bar extending from the forward edge of one of said upright arms to one of said beams, an additional brace bar extending from the rear edge of the other arm to the adjacent beam, an upright guard depending from each beam forwardly of the share, one of said guards being adjustably secured to the forwardly extending brace bar, and an adjustable brace connecting the other guard and the adjacent upright arm.

In testimony whereof I have hereunto set my hand in presence of two subscribing witnesses.

JAMES H. BRODIE.

Witnesses:
MARY E. WILLIAMS,
CHAS. H. WILLIAMS, Jr.

Copies of this patent may be obtained for five cents each, by addressing the "Commissioner of Patents, Washington, D. C."